United States Patent
Spitsberg et al.

(10) Patent No.: US 6,444,053 B1
(45) Date of Patent: *Sep. 3, 2002

(54) PREPARATION OF A NICKLE-BASED SUPERALLOY ARTICLE CONTAINING A REACTIVE ELEMENT AND HAVING A DECARBURIZED SURFACE AND COATING

(75) Inventors: Irene T. Spitsberg, Loveland; Joseph D. Rigney, Milford; Jeffrey A. Pfaendtner, Blue Ash, all of OH (US)

(73) Assignee: General Electric Co., Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/513,869

(22) Filed: Feb. 28, 2000

(51) Int. Cl.$^7$ ................................................. C23C 8/20
(52) U.S. Cl. .................... 148/208; 148/518; 148/535
(58) Field of Search ............................... 148/208, 220, 148/518, 535, 537

(56) References Cited

U.S. PATENT DOCUMENTS

| | | | | |
|---|---|---|---|---|
| 5,334,263 A | * | 8/1994 | Schaeffer | 148/220 |
| 5,556,484 A | * | 9/1996 | Blankenship et al. | 148/211 |
| 5,645,893 A | * | 7/1997 | Rickerby et al. | 148/518 |
| 5,716,720 A | * | 2/1998 | Murphy | 148/537 |
| 6,165,286 A | * | 12/2000 | Bayer et al. | 148/220 |

FOREIGN PATENT DOCUMENTS

FR     2380354    * 10/1978

OTHER PUBLICATIONS

ASM Handbook, vol. 4, Heat Treating, pp. 794–795, 1991, ASM International.*

* cited by examiner

Primary Examiner—George Wyszomierski
(74) Attorney, Agent, or Firm—David L. Narciso

(57) ABSTRACT

A nickel-base superalloy article substrate has more nickel than any other element, a reactive element that is hafnium, zirconium, yttrium, lanthanum, or cerium, or combinations thereof, and a nominal bulk composition of carbon. A protective layer is deposited overlying the surface of the article substrate. The depositing of the protective layer includes steps of decarburizing locations where the carbon serves as a barrier to the diffusion of the reactive element from the substrate into the protective layer, and depositing an aluminum-containing protective layer overlying the substrate. The decreasing of the carbon concentration may be accomplished by decarburizing the substrate, depositing a platinum-containing layer and then decarburizing, depositing an aluminum-containing layer in a reducing atmosphere, or decarburizing the deposited protective layer. A ceramic thermal barrier coating may be deposited overlying the protective layer.

18 Claims, 3 Drawing Sheets

PREPARATION OF A NICKLE-BASED SUPERALLOY ARTICLE CONTAINING A REACTIVE ELEMENT AND HAVING A DECARBURIZED SURFACE AND COATING

This invention relates to a nickel-base superalloy article having a surface region of reduced carbon content and an aluminum-containing protective layer deposited on the surface.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the turbine, upon which the hot combustion gases impinge. In current engines, the turbine vanes and blades are made of nickel-based superalloys, and can operate at temperatures of up to about 1800–2100° F.

Many approaches have been used to protect the turbine blades and vanes against the highly aggressive combustion-gas environment and to increase the operating temperature limit of the turbine blades and vanes. For example, the composition and processing of the base materials themselves have been improved. Physical cooling techniques may also be used.

In another approach, the surfaces of the turbine blades and vanes are coated with aluminum-containing protective coatings that protect the articles against the combustion gas, and in some cases insulate the articles from the temperature of the combustion gas. The articles are thereby able to run cooler and be more resistant to environmental attack.

There may be chemical interactions between the article substrate and the protective coating. In some cases, these interactions adversely affect properties, such as in the formation of topologically close packed (TCP) phases and secondary reaction zones (SRZ). In other cases, the interactions have beneficial effects, such as in the diffusion of strengthening elements from the article substrate into the protective coating. It has been observed that the diffusion of reactive elements such as hafnium and zirconium from the substrate into the coating improves the thermal cycling performance of the coating. However, those results have not always been consistent, and there is a large scatter in the data. Thus, even though there has been an indication of improved performance as a result of the diffusion effects, those improvements cannot be relied upon in all cases.

There is a need for an approach to improving the results obtained by the diffusion of reactive elements from the substrate of the nickel-base superalloy article into the protective coating. The present invention fulfills this need, and further provides related advantages.

BRIEF SUMMARY OF THE INVENTION

The present invention provides a procedure that improves the performance of aluminum-containing protective coatings applied to the surface of a nickel-base superalloy having high levels of reactive elements such as hafnium, zirconium, yttrium, lanthanum, and cerium, and an article having this improved performance. The procedure is readily performed with available apparatus, and may be integrated into the coating process. The coating protects the surface of the article against environmental damage, as in the case of conventional protective coatings.

A method for preparing a surface-protected nickel-base superalloy article comprises the step of providing an article substrate having a surface and having a nominal bulk composition comprising the nickel-base superalloy. The nickel-base superalloy comprises more nickel than any other element, a reactive element selected from the group consisting of hafnium, zirconium, yttrium, lanthanum, and cerium, and combinations thereof, and a nominal bulk composition of carbon. The method further comprises depositing a protective layer overlying the surface of the article substrate. The step of depositing a protective layer includes steps of decarburizing locations, such as surface regions, where the carbon serves as a barrier to the diffusion of the reactive element from the substrate into the protective layer, and depositing an aluminum-containing protective layer overlying the substrate.

In a typical case, the reactive element is hafnium present in an amount of more than about 0.20 weight percent (preferably more than about 0.5 weight percent) in the nominal bulk composition, or zirconium present in an amount of more than about 0.05 weight percent in the nominal bulk composition. The carbon content in the nominal bulk composition is more than about 0.05 weight percent, and the carbon content of a decarburized surface region is less than about 0.02 weight percent, averaged through the surface region. The surface region preferably has a thickness of from about 5 micrometers to about 100 micrometers.

In practicing the method, the reducing of the carbon content is preferably accomplished by contacting a decarburizing agent to the surface of the substrate, decarburizing a platinum-containing layer after deposition (where the protective layer is a platinum aluminide), depositing the aluminum-containing layer from an atmosphere containing a decarburizing agent, and/or decarburizing the substrate and protective layer after it is deposited. The decarburizing agent is preferably a reducing gas such as hydrogen or carbon dioxide.

The present approach provides a low-carbon region in the substrate, adjacent to the surface where the protective layer is deposited, and in the protective layer. The lower carbon content in this region reduces the tendency to form carbides of the reactive elements. Such carbides reduce the level of the free, unreacted reactive element that is available to diffuse to the protective layer and improve its properties. The result is improved performance of the coating during service.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
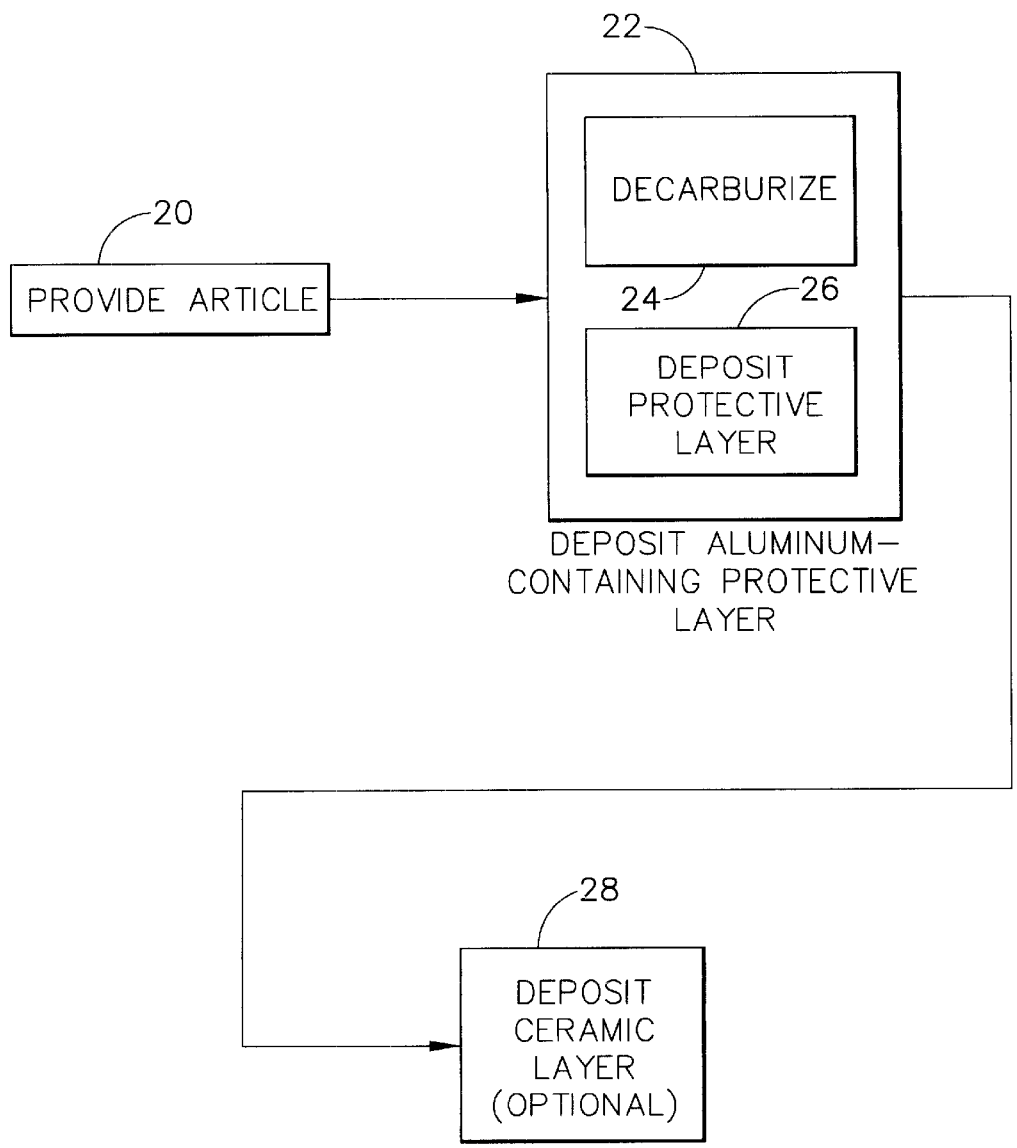
FIG. 1 is a block flow diagram generally illustrating an approach for practicing the invention.
Figure 2:
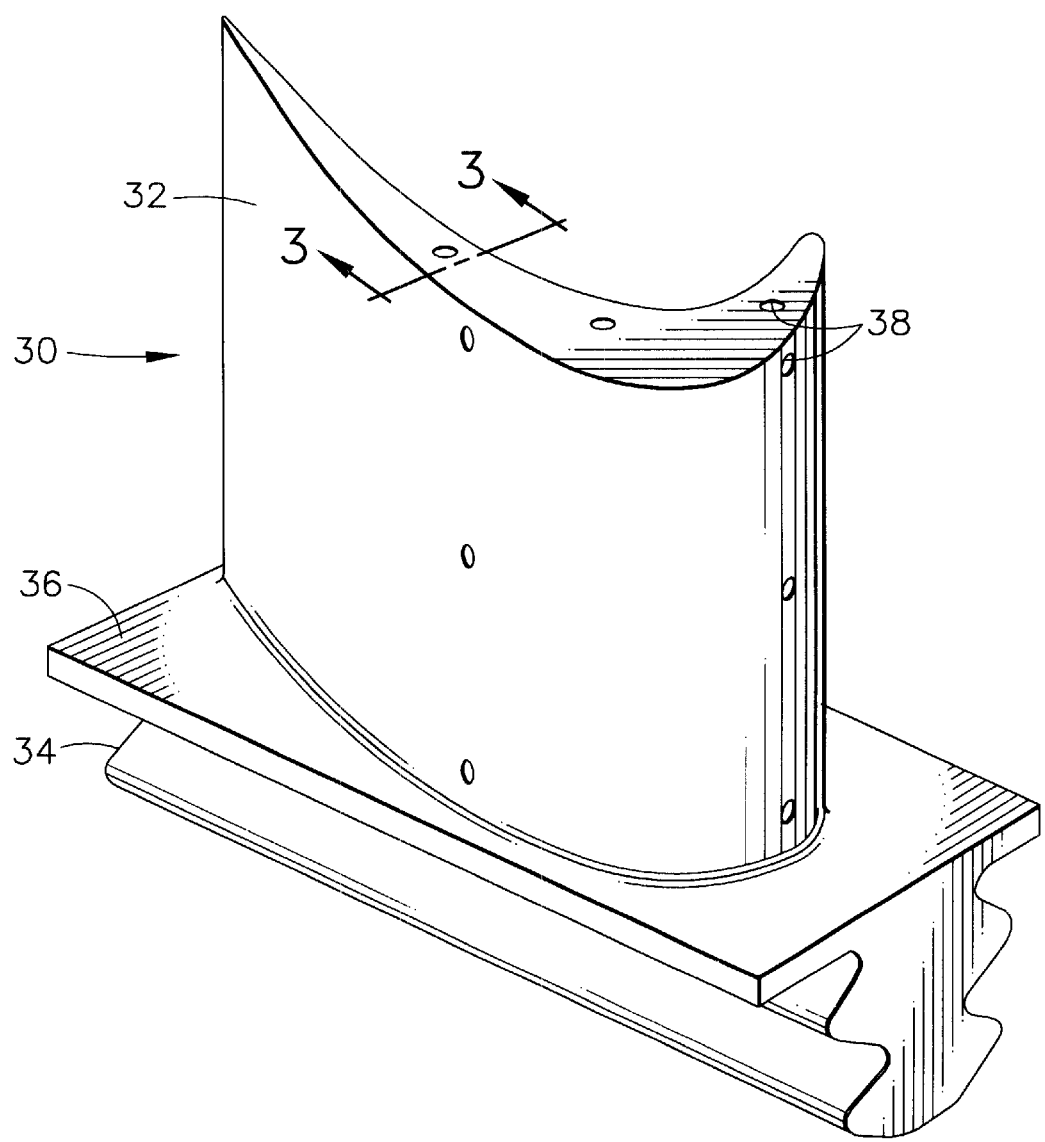
FIG. 2 is a perspective view of a gas turbine blade.

FIG. 1 depicts an approach for practicing the invention. An article is provided, numeral 20. FIG. 2 depicts such an article in the form of a gas turbine blade 30. A turbine vane is similar in relevant aspects. The turbine blade 30 includes an airfoil 32 against which the flow of hot exhaust gas is directed. The turbine blade 30 is mounted to a turbine disk (not shown) by a dovetail 34 which extends downwardly from the airfoil 32 and engages a slot on the turbine disk. A platform 36 extends longitudinally outwardly from the area where the airfoil 32 is joined to the dovetail 34. A number of cooling channels may extend through the interior of the airfoil 32, ending in openings 38 in the surface of the airfoil 32. A flow of cooling air is directed through the cooling channels, to reduce the temperature of the airfoil 32.

The article is made of a nickel-base superalloy. "Nickel-base" means that the superalloy has more nickel than any other single element. The nickel-base superalloy is strengthened by the precipitation of gamma prime precipitates in a gamma matrix, and therefore includes gamma-prime forming elements. The nickel-base superalloy has a nominal bulk composition comprising elements including hafnium, zirconium, yttrium, lanthanum, and/or cerium, and mixtures thereof. The reactive element is preferably present in an amount exceeding about 0.2 weight percent, more preferably more than about 0.5 weight percent, in the case of hafnium; more than about 0.05 weight percent in the case of zirconium; and more than about 0.03 weight percent in the case of yttrium, lanthanum, and cerium. Alloys with lower amounts of these elements do not experience their beneficial effects, and there is no need for the utilization of the present invention. The nickel-base superalloy also contains carbon, preferably present in an amount of from about 0.05 to about 0.15 weight percent.

An example of a preferred nickel-base superalloy that is operable in the present invention is Rene 142, having a nominal composition, in weight percent, of 12.0 percent cobalt, 6.8 percent chromium, 1.5 percent molybdenum, 4.9 percent tungsten, 2.8 percent rhenium, 6.35 percent tantalum, 6.15 percent aluminum, 1.5 percent hafnium, 0.12 percent carbon, 0.015 percent boron, balance nickel and impurities totaling 100 percent. Other alloys having more than the minimum contents of hafnium, zirconium, yttrium, lanthanum, and/or cerium specified above, are also of interest for practicing the invention.

Referring again to FIG. 1, an aluminum-containing protective layer is deposited overlying the surface of the article, numeral 22. This step 22 includes two substeps. One substep includes decarburizing locations where the carbon, if present, would serve as a barrier to the diffusion of the reactive element from the substrate into the protective layer, numeral 24, and the other substep includes depositing the protective layer, numeral 26. These two steps are represented generally within the overall step 22, because they may be performed in any order. That is, step 24 may be performed before, concurrently with, or after step 26. Specific procedures within each of these ordering alternatives will be discussed subsequently.

Figure 3:
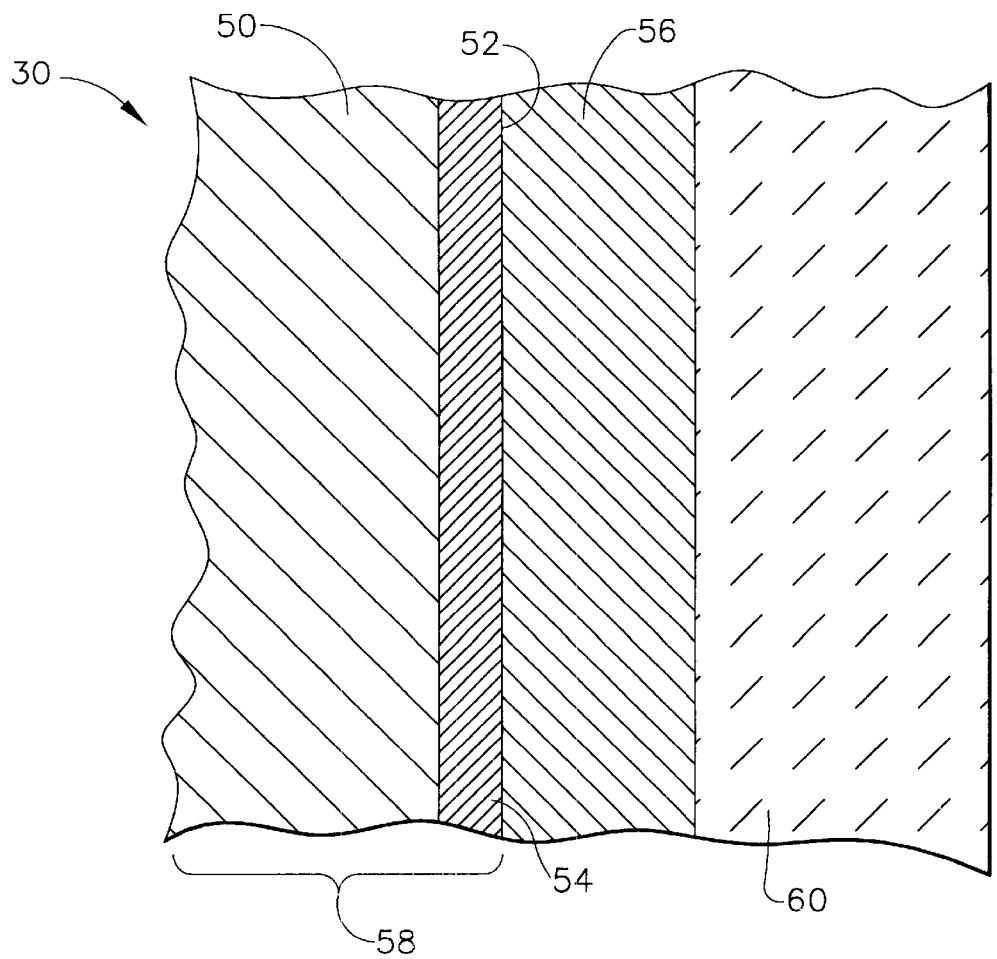
FIG. 3 is an enlarged sectional view through the gas turbine blade of FIG. 2, taken along line 3—3.

FIG. 3 (which is not drawn to scale) is an enlarged sectional view of the turbine blade 30 (or a turbine vane) employing the present invention. The turbine blade 30 includes a bulk region 50 and a surface 52. This surface 52 is of the base turbine blade, not including any overlying layers. Between the bulk region 50 and the surface 52 is a surface region 54. An aluminum-containing protective layer 56 overlies and contacts the surface 52. The turbine blade 30, constituting the bulk region 50, the surface region 54, and the surface 52, acts as a substrate 58 for the protective layer 56.

The surface region 54, and/or the protective layer 56, is depleted in carbon relative to the nominal bulk composition of carbon, by the decarburization process. The carbon content of the surface region 54 is less than that of the nominal bulk carbon content. In the case of Rene 142 alloy, for example, the nominal carbon content of the bulk region 50 is 0.12 percent. The surface region 54 has a carbon content of less than 0.12 percent, preferably substantially less. It is preferred that the average carbon content of the surface region 54 and the protective layer 56 each be less than about 200 parts per million by weight. Desirably, the ratio of the reactive element to carbon, on an atomic basis, exceeds about 50. If a greater amount of carbon is present, it interferes with the ability of the reactive element to diffuse to an overlying aluminum-containing layer, as will be discussed subsequently.

The surface region 54 is preferably of a thickness of from about 5 to about 100 micrometers. The surface region 54 is defined as the region of reduced carbon content as compared with the bulk carbon content. Carbon contents for the surface region 54 are specified as an average value in the surface region, averaged over the thickness of the surface region. Similarly, carbon contents for the protective layer 56 are specified as an average value in the protective layer, averaged over the thickness of the protective layer.

The protective layer 56 may be of any operable type. In one form, the protective layer 56 comprises aluminum and elements interdiffused into the protective layer 56 from the substrate 58. Because nickel is the element present in the substrate 58 in greatest abundance, the protective layer 56 comprises largely aluminum and nickel, plus other elements interdiffused into the protective layer 56 from the substrate 58. This embodiment of the protective layer is typically termed a "nickel aluminide" layer. The aluminum is typically present in an amount of from about 15 to about 32 weight percent, averaged through the protective layer 56.

In another form of the protective layer 56, a noble metal such as platinum is provided in the protective layer 56, so that its composition comprises aluminum, platinum, and elements interdiffused into the protective layer 56 from the substrate 58. In a preferred form of this embodiment, the platinum is present in an average amount of from about 20 to about 30 weight percent, preferably from about 25 to about 28 weight percent, of the protective layer 56, and the aluminum is present in an average amount of from about 14 to about 25 weight percent, preferably from about 18 to about 22 weight percent, of the protective layer 56. The remainder of the protective layer 56 comprises elements interdiffused from the substrate 32.

In a third form of the protective layer 56, the protective layer 56 is formed of an MCrAlX overlay composition. The terminology "MCrAlX" is a shorthand term of art for a variety of families of overlay protective layers 56 that may be employed as environmental coatings or bond coats in thermal barrier coating systems. In this and other forms, M refers to nickel, cobalt, iron, and combinations thereof. In some of these protective coatings, the chromium may be omitted. The X denotes elements such as hafnium, zirconium, yttrium, tantalum, rhenium, platinum, silicon, titanium, boron, carbon, and combinations thereof. Specific compositions are known in the art.

In all three forms, the protective layer 56 is preferably from about 0.0005 to about 0.005 inches in thickness, but lesser or greater thicknesses are operable although less desirable.

After the aluminum-containing protective layer 56 is deposited, a ceramic layer 60 may optionally be deposited overlying and in contact with the protective layer 56, numeral 28 of FIG. 1. When there is no ceramic layer 60, the protective layer 56 may be described as an environmental coating. Where there is a ceramic layer 60, the protective layer 56 may be described as a bond coat, and the combination of the protective layer 56 and the ceramic layer 60 may be described as a thermal barrier coating system. The ceramic layer 60 is preferably yttria-stabilized zirconia, which is zirconium oxide containing from about 2 to about 12 weight percent, preferably from about 3 to about 8 weight percent, of yttrium oxide. The ceramic layer 60 is typically from about 0.003 to about 0.010 inch thick. It may be deposited by any operable technique, such as physical vapor deposition or thermal spray. Other operable ceramic materials may be used as well.

Returning to the discussion of the deposition of the aluminum-containing protective layer, step 22, in one embodiment the carbon content in the surface region 54 is reduced, step 24, prior to the deposition of the protective layer, step 26. In a preferred approach to accomplishing this decarburizing step 24, the turbine blade 30 is heated for a period of from about 1 to about 10 hours at a temperature of from about 1600° F. to about 2100° F. in a reducing atmosphere of hydrogen or carbon dioxide at a pressure of 1 atmosphere.

In another embodiment, the decarburizing step 24 is accomplished simultaneously or concurrently with the deposition step 26. In the case of a nickel aluminide protective layer 56, the source of aluminum is preferably a gaseous source, as in vapor phase aluminiding. A hydrogen halide gas, such as hydrogen chloride, is contacted with aluminum metal or an aluminum alloy to form the corresponding aluminum halide gas. Aluminide-modifying elements such as hafnium, zirconium, yttrium, silicon, titanium, tantalum, cobalt, chromium, platinum, and palladium, may optionally be doped from similar sources into the gaseous source. A reducing gas such as hydrogen is mixed into the source gas, in a concentration exceeding about 1 percent by volume. The source gas is passed over the turbine blade 30. Aluminum, with any optional dopants included, is deposited onto the surface 52. The deposition reaction typically occurs at elevated temperature such as from about 1700° F. to about 2100° F. so that deposited aluminum atoms interdiffuse into the substrate 58, and atoms from the substrate diffuse into the protective layer 56. An aluminide coating about 0.002 inch thick may be deposited in about 4–8 hours using this approach. Other known and operable aluminum-deposition techniques such as pack cementation, above-the-pack aluminiding, slurry deposition, chemical vapor deposition (CVD), and organo-metallic chemical vapor deposition may also be used.

Where the protective layer 56 is a platinum aluminide, a platinum sublayer is first deposited on the surface 52. In one approach, the deposition is accomplished by electrodepositing platinum from a platinum-containing solution onto the surface 52. An operable platinum-containing aqueous solution is $Pt(NH_3)_4HPO_4$ having a concentration of about 4–20 grams per liter of platinum, and a voltage/current source is operated at about ½–10 amperes per square foot of facing article surface. The platinum layer 34 about 5 micrometers thick is deposited in 1–4 hours at a temperature of 190–200° F. After this thin platinum sublayer is deposited, carbon may be removed from both the surface region 54 and the platinum sublayer by heating the turbine blade 30 for a period of from about 1 to about 6 hours at a temperature of from about 1600° F. to about 2100° F. in a reducing atmosphere of hydrogen or carbon dioxide at a pressure of about 1 atmosphere. The aluminum layer is thereafter deposited overlying the platinum layer as described above, with or without the use of a reducing gas in the aluminum-deposition step.

In another embodiment, the decarburizing step 24 is accomplished after the deposition step 26 is completed. In this case, the turbine blade 30, with the protective layer 56 in place, is heated for a period of from about 1 to about 10 hours at a temperature of from about 1600° F. to about 2100° F. in a reducing atmosphere of hydrogen or carbon dioxide at a pressure of about 1 atmosphere.

The decarburizing step 24 may thus be accomplished before, during, or after the deposition step 26. These different techniques may also be used together, as for example by performing decarburization 24 before, during, and after the deposition step 26 in order to assure maximum carbon removal from the surface region 54 and in the protective layer 56.

The invention has been reduced to practice. In a first series of tests, the ability to decarburize the surface regions of the substrate was determined. All carbon content measurement was by glow discharge mass spectroscopy. In a first test, the carbon content of a bare Rene 142 substrate was determined before and after heat treatment in flowing hydrogen at 1 atmosphere pressure for a period of 6 hours at a temperature of 1975° F. Before hydrogen heat treatment, the top 19 micrometers of the substrate had an average carbon content of 105 parts per million by weight (ppmw). After the hydrogen heat treatment, the top 19 micrometers had an average carbon content of 49 ppmw. A second test duplicated the first test, except that the substrate had a 5 micrometer thick layer of platinum plated thereon. Before the hydrogen heat treatment, the top 8 micrometers had an average carbon content of 300 ppmw. After the hydrogen heat treatment of 3 hours at 1925° F. in 1 atmosphere of flowing hydrogen, the top 8 micrometers had an average carbon content of 110 ppmw. A third test compared the effects of vapor phase aluminiding with an argon carrier gas and chemical vapor deposition aluminiding with a hydrogen carrier gas. Each approach was used to deposit a 45 micrometer thick layer of aluminum on a nickel foil. For the deposition by vapor phase aluminiding with an argon carrier gas, the top 60 micrometers of deposited material had an average carbon content of 290 ppmw. For the deposition by chemical vapor deposition in a hydrogen carrier gas, the top 60 micrometers had an average carbon content of 10 ppmw. The ability to reduce the carbon content of the surface region is therefore demonstrated.

Second, third, fourth, and fifth series of tests were conducted to determine the effect of decarburization on the furnace cycle testing properties of button-type test specimens of Rene 142 alloy. The specimens were tested in furnace cycle testing (FCT) with 1 hour cycles between room temperature and 2125° F. Sets of samples were prepared as a baseline (i.e., no decarburization) to compare to the furnace cycle test performance of samples that were decarburized at different stages of the coating process. These samples were prepared by plating platinum by onto 11 specimens, heat treating as described below, vapor phase alumniniding, and depositing a thermal barrier coating of yttria-stabilized zirconia by electron beam physical vapor deposition. After platinum plating and before aluminiding, all of the specimens were given a conventional vacuum diffusion heat treatment of 1925° F. for 2 hours in a vacuum of about $10^{-4}$ to $10^{-5}$ torr. These baseline samples exhibited an average FCT life of 151 cycles.

For the second series of tests, seven specimens were prepared in a similar manner as the baseline except that the as-platinum-plated specimens were decarburized in 1 atmosphere of hydrogen gas for three hours at a temperature of 1925° F. They were subsequently aluminided and coated with ceramic. These specimens exhibited an average FCT life of 251 cycles, or 66 percent better than the baseline.

For the third series of tests, decarburization of the substrate prior to deposition of the protective layer was evaluated. A group of four specimens was decarburized in hydrogen at 1975° F. for 6 hours prior to deposition of the platinum layer, aluminide, and ceramic layers. These specimens exhibited an average FCT life of 190.0 cycles, or 26 percent better than the comparable baseline.

For the fourth series of tests, the substrate was not decarburized prior to deposition of the protective layer. A platinum layer was first plated onto the substrate for all of the specimens. A group of 4 specimens then had an aluminum layer deposited over the platinum layer by chemical vapor deposition in a hydrogen atmosphere. These 4 specimens exhibited an average FCT life of 275 cycles. The baseline group of 11 specimens had an aluminum layer deposited over the platinum layer by vapor phase aluminiding in an argon-containing atmosphere. These 11 specimens exhibited an average FCT life of 151 cycles. This example demonstrates the beneficial effect of the deposition of the aluminum layer in a hydrogen atmosphere.

For the fifth series of tests, a combined treatment was used on a group of four test specimens. The platinum layer was decarburized in hydrogen using the approach described above for the second series of tests. Additionally, the aluminiding was accomplished in a hydrogen atmosphere using the approach described above for the fourth series of tests. These four specimens exhibited an average FCT life of 365 cycles, as compared with the average FCT life of 151 cycles for the baseline group of 11 specimens.

Statistical analysis indicates that all of the test groups yielded statistically better ($p \leq 0.050$) performance than the baseline group.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

What is claimed is:

1. A method for preparing a surface-protected nickel-base superalloy article, comprising the steps of
   providing an article substrate having a surface and having
      a nominal bulk composition comprising the nickel-base superalloy, the nickel-base superalloy comprising
         more nickel than any other element,
         reactive element selected from the group consisting of hafnium, zirconium, yttrium, lanthanum, and cerium, and combinations thereof, and
      a nominal bulk composition of carbon; and
   depositing a protective layer overlying the surface of the article substrate, the step of depositing a protective layer including steps of
      decarburizing locations where the carbon serves as a barrier to the diffusion of the reactive element from the substrate into the protective layer, and
      depositing an aluminum-containing protective layer overlying the substrate, wherein the step of decarburizing includes the step of decarburizing the substrate prior to the step of depositing the aluminum-containing protective layer.

2. The method of claim 1, wherein the step of depositing is accomplished by the step of
   depositing the aluminum-containing protective layer in a reducing atmosphere.

3. The method of claim 1, wherein the step of decarburizing includes the steps of
   decarburizing the substrate with the aluminum-containing protective layer deposited thereon, after the step of depositing the aluminum-containing protective layer.

4. The method of claim 1, wherein the reactive element comprises hafnium present in an amount of more than about 0.2 weight percent in the nominal bulk composition.

5. The method of claim 1, wherein the reactive element comprises zirconium present in an amount of more than about 0.05 percent in the nominal bulk composition.

6. The method of claim 1, including an additional step, after the step of depositing a protective layer, of
   depositing a ceramic layer overlying the protective layer.

7. The method of claim 1, wherein the reactive element is selected from the group consisting of hafnium present in an amount of more than about 0.2 weight percent, zirconium, yttrium present in an amount of more than about 0.03 weight percent, lanthanum, and cerium, and combinations thereof.

8. A method for preparing a surface-protected nickel-base superalloy article, comprising the steps of
   providing an article substrate having a surface and having
      a nominal bulk composition comprising the nickel-base superalloy, the nickel-base superalloy comprising
         more nickel than any other element,
         a reactive element selected from the group consisting of hafnium, zirconium, yttrium, lanthanum, and cerium, and combinations thereof, and
      a nominal bulk composition of carbon; and
   depositing a protective layer overlying the surface of the article substrate, the step of depositing a protective layer including steps of
      decarburizing locations where the carbon serves as a barrier to the diffusion of the reactive element from the substrate into the protective layer, and
      depositing an aluminum-containing protective layer overlying the substrate, wherein the step of decarburizing includes the steps of
   depositing a platinum-containing layer overlying the substrate, thereafter
   decarburizing the platinum-containing layer, and thereafter
   depositing the aluminum-containing protective layer overlying the platinum containing layer.

9. The method of claim 8, wherein the reactive element is selected from the group consisting of hafnium present in an amount of more than about 0.2 weight percent, zirconium, yttrium present in an amount of more than about 0.03 weight percent, lanthanum, and cerium, and combinations thereof.

10. A method for preparing a surface-protected nickel-base superalloy article, comprising the steps of
   providing an article substrate having a surface and having
      a nominal bulk composition comprising the nickel-base superalloy, the nickel-base superalloy comprising more nickel than any other element, a reactive element selected from the group consisting of hafnium, zirconium, yttrium, lanthanum, and cerium, and combinations thereof, and a nominal bulk composition of carbon; and depositing a protective layer overlying the surface of the article substrate, the step of depositing a protective layer including steps of depositing a platinum-containing layer overlying the substrate, thereafter decarburizing the platinum-containing layer, and thereafter depositing an aluminum-containing protective layer overlying the platinum-containing layer.

11. The method of claim 10, wherein the reactive element comprises hafnium present in an amount of more than about 0.2 weight percent in the nominal bulk composition.

12. The method of claim 10, wherein the reactive element comprises zirconium present in an amount of more than about 0.05 percent in the nominal bulk composition.

13. The method of claim 10, including an additional step, after the step of depositing a protective layer, of depositing a ceramic layer overlying the protective layer.

14. A method for preparing a surface-protected nickel-base superalloy article, comprising the steps of providing an article substrate having a surface and having a nominal bulk composition comprising the nickel-base superalloy, the nickel-base superalloy comprising more nickel than any other element, a reactive element selected from the group consisting of hafnium, zirconium, yttrium, lanthanum, and cerium, and combinations thereof, and a nominal bulk composition of carbon; and depositing a protective layer overlying the surface of the article substrate, the step of depositing a protective layer including steps of depositing an aluminum-containing protective layer overlying the surface of the article substrate, and thereafter decarburizing the substrate with the aluminum-containing protective layer deposited thereon, the step of decarburizing the substrate being performed in a reducing atmosphere.

15. The method of claim 14, wherein the reactive element comprises hafnium present in an amount of more than about 0.2 weight percent in the nominal bulk composition.

16. The method of claim 14, wherein the reactive element comprises zirconium present in an amount of more than about 0.05 percent in the nominal bulk composition.

17. The method of claim 14, including an additional step, after the step of depositing a protective layer, of depositing a ceramic layer overlying the protective layer.

18. The method of claim 14, wherein the reactive element is selected from the group consisting of hafnium present in an amount of more than about 0.2 weight percent, zirconium, yttrium present in an amount of more than about 0.03 weight percent, lanthanum, and cerium, and combinations thereof.

* * * * *